(12) United States Patent
Takahashi et al.

(10) Patent No.: US 10,191,136 B2
(45) Date of Patent: Jan. 29, 2019

(54) DETERMINING MISS DISTANCE AND BULLET SPEED OF A BURST OF BULLETS

(71) Applicant: BAE Systems Information and Electronics System Integration Inc., Nashua, NH (US)

(72) Inventors: Jonathan R. Takahashi, Pelham, NH (US); John F. Ebersole, Jr., Bedford, NH (US); Brian A. Harris, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 401 days.

(21) Appl. No.: 15/028,519

(22) PCT Filed: Aug. 6, 2015

(86) PCT No.: PCT/US2015/043905
§ 371 (c)(1),
(2) Date: Apr. 11, 2016

(87) PCT Pub. No.: WO2016/022743
PCT Pub. Date: Feb. 11, 2016

(65) Prior Publication Data
US 2016/0252604 A1    Sep. 1, 2016

Related U.S. Application Data (60) Provisional application No. 62/033,906, filed on Aug. 6, 2014.

(51) Int. Cl.
*G01S 3/808* (2006.01)
*G01S 11/14* (2006.01)
(Continued)

(52) U.S. Cl.
CPC .............. *G01S 3/808* (2013.01); *F41G 3/147* (2013.01); *G01S 3/782* (2013.01); *G01S 11/14* (2013.01); *G01S 3/8086* (2013.01)

(58) Field of Classification Search
CPC ........ G01S 3/782; G01S 3/808; G01S 3/8086; G01S 11/14; F41G 3/147
See application file for complete search history.

(56) References Cited

U.S. PATENT DOCUMENTS 5,241,518 A    8/1993  McNelis et al.
5,258,962 A    11/1993 Karlsen
(Continued)

FOREIGN PATENT DOCUMENTS

EP    3177940 A1 *    6/2017
EP    3177940 A4 *    4/2018
(Continued)

OTHER PUBLICATIONS

Duckworth et al., Fixed and wearable acoustic counter-sniper systems for law enforcement, Nov. 5, 1998, pp. 1-22. (Year: 1998).*
(Continued)

*Primary Examiner* — Daniel Pihulic
(74) *Attorney, Agent, or Firm* — Davis & Bujold, PLLC (57) ABSTRACT

Disclosed is an example for determining miss distance and bullet speed of a burst of bullets. In one example, shock wave (SW) vectors emanating from bullets are estimated using a first sensor. Further, firing point (FP) vectors and closest-point-of-approach (CPA) vectors emanating from the bullets are estimated using a second sensor. The first sensor and the second sensor are disposed on a platform. The SW vectors, the FP vectors and the CPA vectors are determined as emanating from the burst of bullets. The miss distance and bullet speed of the burst of bullets are deter-
(Continued)

mined using the FP vectors, the SW vectors, and the CPA vectors that are emanating from the burst of bullets.

20 Claims, 4 Drawing Sheets

(51) Int. Cl.
*G01S 3/782* (2006.01)
*F41G 3/14* (2006.01)

(56) References Cited

U.S. PATENT DOCUMENTS

| | | | |
|---|---|---|---|
| 6,178,141 B1 | 1/2001 | Duckworth et al. | |
| 6,563,763 B2 | 5/2003 | McNelis | |
| 6,621,764 B1 * | 9/2003 | Smith | F41H 11/00 367/128 |
| 7,643,377 B1 | 1/2010 | Uzes | |
| 8,149,649 B1 | 4/2012 | Brinn et al. | |
| 8,320,217 B1 * | 11/2012 | Barger | F41G 3/147 367/127 |
| 2006/0044941 A1 | 3/2006 | Barger | |
| 2010/0278387 A1 | 11/2010 | Agurok et al. | |
| 2011/0315767 A1 | 12/2011 | Lowrance | |
| 2016/0252604 A1 * | 9/2016 | Takahashi | F41G 3/147 367/124 |

FOREIGN PATENT DOCUMENTS

| | | | |
|---|---|---|---|
| KR | 20170039283 A * | 4/2017 | F41G 3/147 |
| WO | WO2014082670 A1 | 6/2014 | |
| WO | PCT/US15/043905 | 8/2015 | |
| WO | WO-2016022743 A1 * | 2/2016 | F41G 3/147 |

OTHER PUBLICATIONS

Steve Snarski et al., Results of field testing with the FightSight infrared-based projectile tracking and weapon-fire characterization technology, Proceedings Optical Diagnostics of Living Cells II, vol. 7666, Apr. 23, 2010.

Marco Cannella et al., A novel approach for determining the trajectory and speed of a supersonic object; Evaluation of trajectory and speed of supersonic objects, Measurement Science and Technology, I0P, Bristol, GB, vol. 14, No. 5, May 1, 2003.

EP Search Report, EP 15 83 0738, dated Mar. 19, 2018, 10 pages.

* cited by examiner

DETERMINING MISS DISTANCE AND BULLET SPEED OF A BURST OF BULLETS

CROSS-REFERENCE TO RELATED APPLICATIONS

This Application claims rights under 35 USC § 119(e) from U.S. Application 62/033,906 filed on Aug. 6, 2014, the contents of which are incorporated herein by reference.

STATEMENT OF GOVERNMENT INTEREST

This invention was made with United States Government support under Contract No. H94003-04-D-0002-0079 awarded by UNITED STATES AIR FORCE. The United States Government has certain rights in this invention.

BACKGROUND OF THE INVENTION

Field of the Invention

The present invention relates to determining gunfire detections, and more specifically, utilizing sensors for determining miss distance and bullet speed of a burst of bullets.

Brief Description of Related Art

During high tension gunfights, sensors may be used in a platform, such as a stationary structure or a vehicle (e.g., aircraft) to determine the origin and trajectory of fired rounds/bullets. Example bullet may be any projectile such as a bullet, artillery shell, missile, bombs, or other object that exhibit the characteristics consistent with a bullet in flight. The bullet may be propelled from a firearm. Some existing methods may use electro-optic (EO) sensors to detect the gunfire, while some other methods may use acoustical sensors. Further, some existing methods may attempt to combine utilizing both EO and acoustical sensors, however, this may require an increased correlative element and certainty that data points collected from the EO sensors match the associated data points collected by the acoustical sensors. Failure to do so may result in irrelevant correlations of data points with respect to bullets from multiple gunmen interfering.

Typically, the EO and acoustic sensor detections may be fused "round to round", i.e., attempting to correlate between a single EO detection and a single acoustic detection. In the single round approach, one sensor may detect a round while the other fails to detect the round. For example, the EO sensors can only detect some of rounds whereas acoustic sensors can potentially detect all the rounds. Further, in case where both sensors detect a round, the EO round detection may be paired with an incorrect acoustically detected round.

SUMMARY OF THE INVENTION

A method and system for determining miss distance and bullet speed of a burst of bullets. According, to one aspect of the present subject matter, shock wave (SW) vectors emanating from bullets are estimated using a first sensor. Further, firing point (FP) vectors and closest-point-of-approach (CPA) vectors emanating from the bullets are estimated using a second sensor. The first sensor and the second sensor are disposed on a platform. For example, the first sensor is an acoustic sensor and the second sensor is an electro-optic sensor. The SW vectors, the FP vectors and the CPA vectors are determined as emanating from the burst of bullets. The miss distance and bullet speed of the burst of bullets are determined using the FP vectors, the SW vectors, and the CPA vectors that are emanating from the burst of bullets.

According to another aspect of the present subject matter, a system includes a first sensor to detect SW vectors, a second sensor to detect FP vectors and CPA vectors, and a computational unit communicatively coupled to the first sensor and the second sensor, the computational unit is configured to perform the method described above.

According to another aspect of the present subject matter, a non-transitory computer-readable storage medium including instructions that are executed by a computational unit to perform the method described above.

The system and method disclosed herein may be implemented in any means for achieving various aspects. Other features will be apparent from the accompanying drawings and from the detailed description that follow.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

DETAILED DESCRIPTION OF THE INVENTION

The examples described herein in detail for illustrative purposes are subject to many variations in structure and design. Several sensors may be disposed on a platform, such as a stationary structure or a vehicle (e.g., aircraft) to track fired bullets or rounds. Example sensors may be electro-optic (EO) sensors, acoustic sensors, and the like. Some systems may use the acoustic sensors to track the bullets, whereas the other systems may use the EO sensors to track the bullets. EO sensors may detect bullets as they fly by a moving vehicle. Existing methods may track a single round. Further, the existing methods may give two pieces of information, i.e., the direction of the CPA of the round (i.e. CPA vector), and the direction of the firing point (i.e., FP vector). Acoustic sensors may detect the shockwave (SW) that is generated by a supersonic bullet. Detected SW may be reported with the direction of the SW. The angle between the shock direction vector and the CPA vector may yield miss distance and bullet speed which aids hostile intent determination.

Typically, the EO and acoustic sensor detections may be fused "round to round", i.e., attempting to calculate a CPA-shock angle between a single EO detection and a single acoustic detection. In the single round approach, one sensor may detect a round while the other may fail to detect the round.

Examples described herein provide an enhanced system, technique and a method for determining miss distance and bullet speed of bullets in a burst mode. In firearms, a burst mode or burst fire may refer to a firing mode enabling a shooter to fire a predetermined number of rounds, for example two or three rounds on hand held weapons and over 100 on anti-aircraft weapons, with a single pull of the trigger. Example firearms can include submachine guns, assault rifles, carbines, machine pistols (e.g., the Beretta 93R) and so on. Example bullet may be any projectile such as a bullet, artillery shell, missile, bombs, or other object that exhibit the characteristics consistent with a bullet in flight.

In burst mode, a tracked estimate of CPA vector (e.g., CPA direction) and SW vector (i.e., shock direction) from multiple rounds is used instead of attempting to correlate between single round detections. In other words, the correlation occurs at the "burst level" rather than the "round level". Thereby, CPA vectors and SW vectors can be correlated even when the acoustic and EO sensors do not detect the same round. By using the predicted location estimate of both the CPA vector and the SW vector rather than the raw measurements from single round, changes in the gunfire path over time can be accounted. In this case, the SW vectors, the FP vectors and the CPA vectors are determined as emanating from the burst of bullets when the computed CPA-shock angle is within a predetermined range. Further, additional correlation criteria can be employed by incorporating the tracked FP estimate, i.e., a coplanar check that checks the CPA vectors, SW vectors and FP vectors are substantially coplanar, and a check that ensures the SW vector is between the FP vector and CPA vector. These additional checks may reduce any false correlation, which can be useful when reflected shocks or multiple gunners are present.

In one example, the CPA vector and FP vector may be tracked in multi-round bursts or bursts of ammunition. The SW vector is tracked in a multi-round acoustic burst. The shock angle direction may be predicted or estimated based on the CPA and SW vector from other respective bursts. Bursts are paired when the predicted/estimated FP vector, CPA vector, and SW vector are all significantly coplanar, and the shock angle between the CPA vector and the SW vector is within an expected range based on possible bullet speeds, and a round from each burst is substantially recently detected.

Further, the terms "correlation angle" and "shock angle" are used interchangeably throughout the document.

Figure 1:
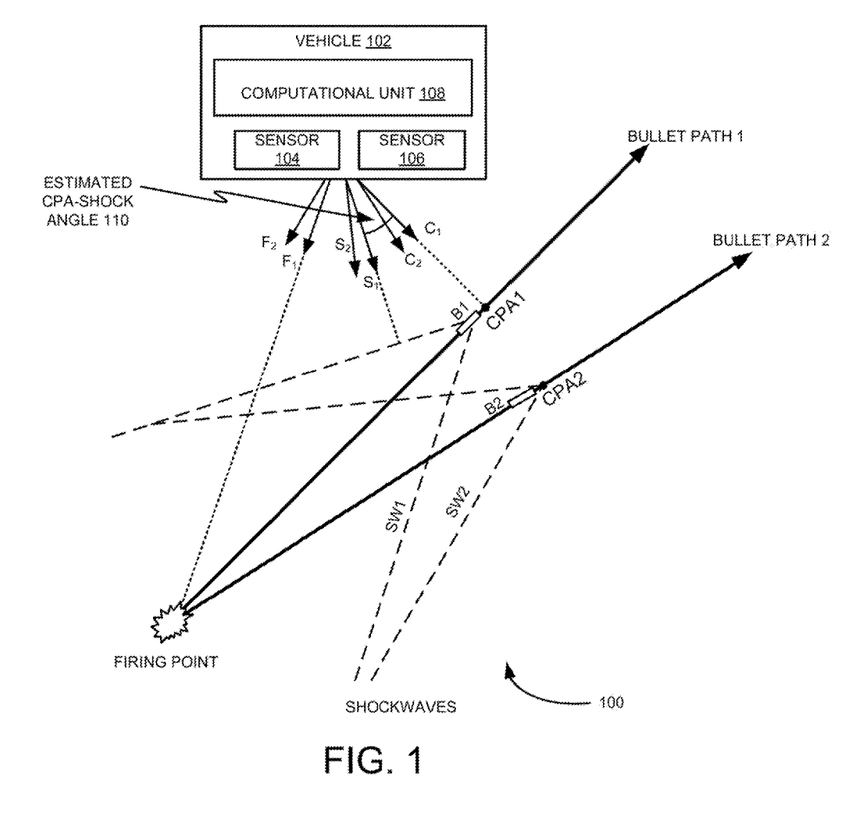
FIG. 1 illustrates an example system for determining miss distance and bullet speed of a burst of bullets.

Referring now to FIG. 1, the system 100 includes a target vehicle 102 (e.g., aircraft). The target vehicle 102 includes a first sensor 104, a second sensor 106 and a computational unit 108. Example first sensor 104 can include an acoustic sensor and example second sensor 106 can include an EO sensor. In the example shown in FIG. 1, the sensors are disposed on the vehicle, however, the sensors can also be disposed on a stationary structure. The computational unit 108 can be any combination of hardware and programming to implement the functionalities described herein. Example computational unit 108 can include a processor.

In operation, the first sensor 104 detects shockwave (SW) vectors emanating, from bullets and the second sensor 106 detects FP and CPA vectors emanating from the bullets. The SW vectors include a direction of SWs of the bullets relative to the platform. In the example shown in FIG. 1, the first sensor 104 detects SW vectors S1 and S2 of SW1 and SW2 emanating from the bullets B1 and B2, respectively. For example, the shockwave is a physical and audible wave created in the air when a bullet travels at speeds faster than the speed of sound. In the example shown in FIG. 1, the shockwave includes a mach cone shaped sound waves produced by the bullets B1 and B2.

Further in operation, the second sensor 106 detects the FP and CPA vectors emanating from the bullets. The FP vectors and the CPA vectors include a direction of FPs and a direction of CPAs, respectively, of the bullets relative to the platform. In the example shown in FIG. 1, the second sensor 106 detects FP1 and FP2 vectors and CPA1 and CPA2 vectors associated with the bullets B1 and B2, respectively. The FP is a position from which a firearm/weapon is fired. Further, a muzzle flash is produced when a weapon is fired, the muzzle flash can be used to detect/estimate the firing point of the bullets. In the example shown in FIG. 1, the muzzle flash may be a visible light that is produced by the firing of bullets from the weapon. The CPA is the position of the bullet when it is closest to the target vehicle 102, and the CPA vector is the direction of the vector pointing toward the CPA relative to the target vehicle 102. For example, the second sensor includes cameras that are disposed in the aircraft 102. These cameras include a field-of-view within which the bullets (e.g., B1 and B2) may be tracked. The tracking may be done by measuring the angular positions of the bullets with respect to the platform or vehicle 102.

Furthermore, the computational unit 108 may be communicatively connected to the first sensor 104 and the second sensor 106. The computational unit 108 receives the detected SW vectors and detected FP and CPA vectors emanating from the bullets. In one example, the computational unit 108 receives the detected information (i.e., FP and CPA vectors together) from the second sensor 106 and then estimates the FP vectors and CPA vectors separately from the detected information.

Further, the computational unit 108 is configured to determine that the SW vectors, the FP vectors and the CPA vectors are emanating from the burst of bullets. In one example, the computational unit 108 computes a CPA-shock angle (e.g., CPA-shock angle 110) between the CPA vectors and the SW vectors and determining that the SW vectors, the FP vectors and the CPA vectors are emanating from the same burst of bullets when the computed shock angle is within a predetermined range. In another example, the computational unit 108 performs an additional coplanar check to determine whether the FP vectors, the CPA vectors, and the SW vectors are substantially coplanar and determines that the SW vectors, the FP vectors and the CPA vectors are emanating from the same burst of bullets when the FP vectors, the CPA vectors, and the SW vectors are substantially coplanar.

In yet another example, the computational unit 108 performs an additional check to determine whether the SW vectors lies in between the CPA vectors and the FP vectors and determining that the SW vectors, the FP vectors and the CPA vectors are emanating from the same burst of bullets when the SW vectors lies in between the CPA vectors and the FP vectors. The one or more of these checks may ensure that the SW vectors, the FP vectors and the CPA vectors are coming from the same burst. If the detections are correlated that means they come from the same burst, then the correlated information (i.e., the SW vectors, the FP vectors and the CPA vectors) can be used to determine the miss distance and bullet speed of the bullets in the same burst. The miss distance of the burst of bullets may be determined relative to the platform.

The computational unit 108 is configured to determine the miss distance and bullet speed of the burst of bullets using the FP vectors, the SW vectors, and the CPA vectors upon determining that the SW vectors, the FP vectors and the CPA vectors are emanating from the same burst of bullets. In one example, the computational unit 108 computes an aggregated estimate of the SW vectors (i.e., S1, S2, and S3), an aggregated estimate of the FP vectors (e.g., F1, F2, and F3), and an aggregated estimate of the CPA vectors (e.g., C1, C2, and C3), and determines the shock angle using the aggregated estimate of the CPA vector and the aggregated estimate of the SW vector. Computational unit 108 then computes the bullet speed using the shock angle, and then computes the miss distance using the bullet speed and the angular rate of the bullet at the CPA location. The angular rate is determined by tracking the bearing of the bullet as seen by the EO sensor. In one example, the miss distance and the bullet speed may be determined from the shock angle as follows:

$$\text{Mach number} = \frac{1}{\sin \theta}$$

Where, $\theta$ is the computed shock angle between the CPA vectors and the SW vectors. From the above equation, the miss distance and bullet speed are determined as follow, $$\text{Bullet speed} = \text{Mach number} * \text{Speed of Sound; and}$$

$$\text{Miss distance} = \frac{\text{Bullet speed}}{\text{Angular rate of the bullet at } CPA}$$

Where, the angular rate of the bullet at the CPA may be determined by tracking the bearing of the bullet using the EO sensor.

Figure 2:
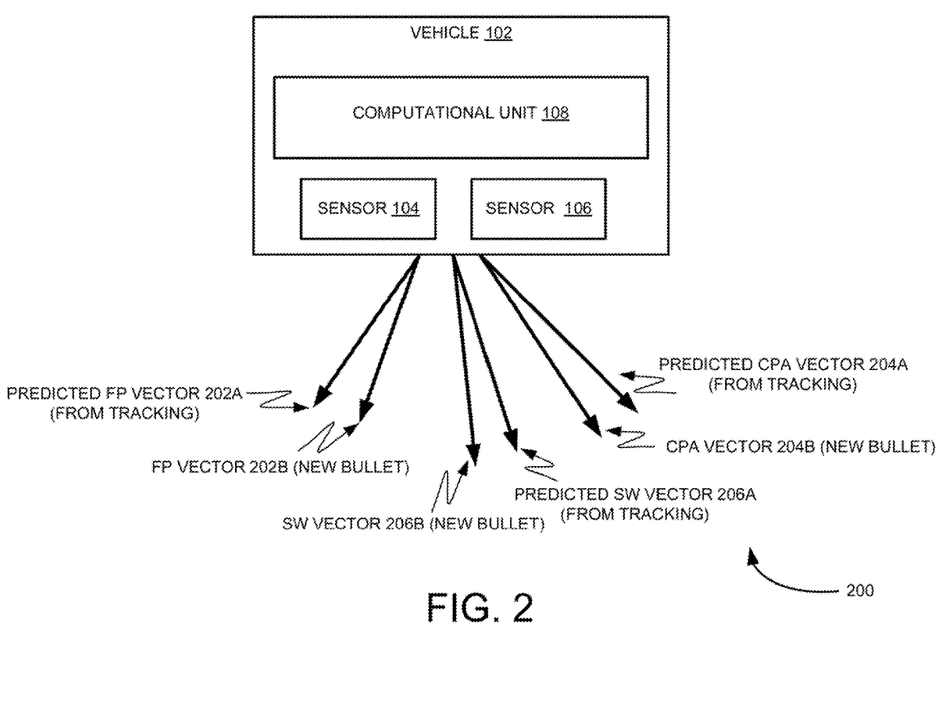
FIG. 2 illustrates an example system depicting an actual firing point, an actual CPA vector and an actual SW vector of the burst of bullets.

Referring now to FIG. 2, which illustrates an example system 200 depicting an actual firing point, actual CPA vector and an actual SW vector of the burst of bullets. FIG. 2 depicts the actual SW vector 206B, FP vector 202B, and CPA vector 204B of a bullet/burst of bullets that are computed based on the tracked/detected/predicted SW vectors 206A, FP vectors 202A and CPA 204A vectors.

Figure 3:
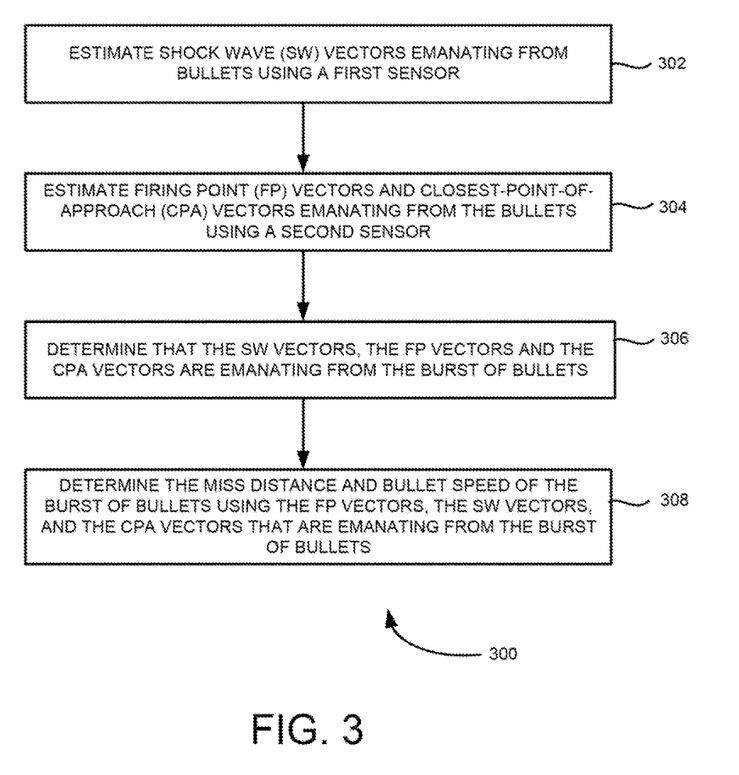
FIG. 3 illustrates an example flowchart for determining a miss distance and bullet speed of a burst of bullets.

FIG. 3 illustrates an example flowchart for determining miss distance and bullet speed of a burst of bullets. At block 302, shock wave (SW) vectors emanating from bullets are estimated/predicted using a first sensor. Example first sensor is an acoustic sensor. The SW vectors include a direction of SWs of the bullets relative to the platform. At block 304, firing point (FP) vectors and closest-point-of-approach (CPA) vectors emanating from the bullets are estimated/predicted using a second sensor. Example second sensor is an electro-optic sensor. The FP vectors and the CPA vectors include a direction of FPs and a direction of CPAs, respectively, of the bullets relative to the platform. The first sensor and the second sensor are disposed on a platform such as a stationary platform or a vehicle (e.g., Aircraft on fly).

At block 306, the SW vectors, the FP vectors and the CPA vectors are determined as emanating from the burst of bullets. In one example, a shock angle between the CPA vectors and the SW vectors is computed. Further, the SW vectors, the FP vectors and the CPA vectors are determined as emanating from the burst of bullets when the computed shock angle is within a predetermined range. In another example, a coplanar check is performed to determine whether the FP vectors, the CPA vectors, and the SW vectors are substantially coplanar. Further, the SW vectors, the FP vectors and the CPA vectors are determined as emanating from the burst of bullets when the FP vectors, the CPA vectors, and the SW vectors are substantially coplanar. In yet another example, a check is made to determine whether the SW vectors lies in between the CPA vectors and the FP vectors. Further, the SW vectors, the FP vectors and the CPA vectors are determined as emanating from the burst of bullets when the SW vectors lies in between the CPA vectors and the FP vectors.

At block 308, the miss distance and bullet speed of the burst of bullets are determined using the FP vectors, the SW vectors, and the CPA vectors that are emanating from the burst of bullets. In one example, an aggregated estimate of the SW vectors, an aggregated estimate of the FP vectors, and an aggregated estimate of the CPA vectors are computed. Then, the miss distance and bullet speed of the burst of bullets are determined using the aggregated estimate of the SW vectors, the aggregated estimate of the FP vectors and the aggregated estimate of the CPA vectors.

Figure 4:
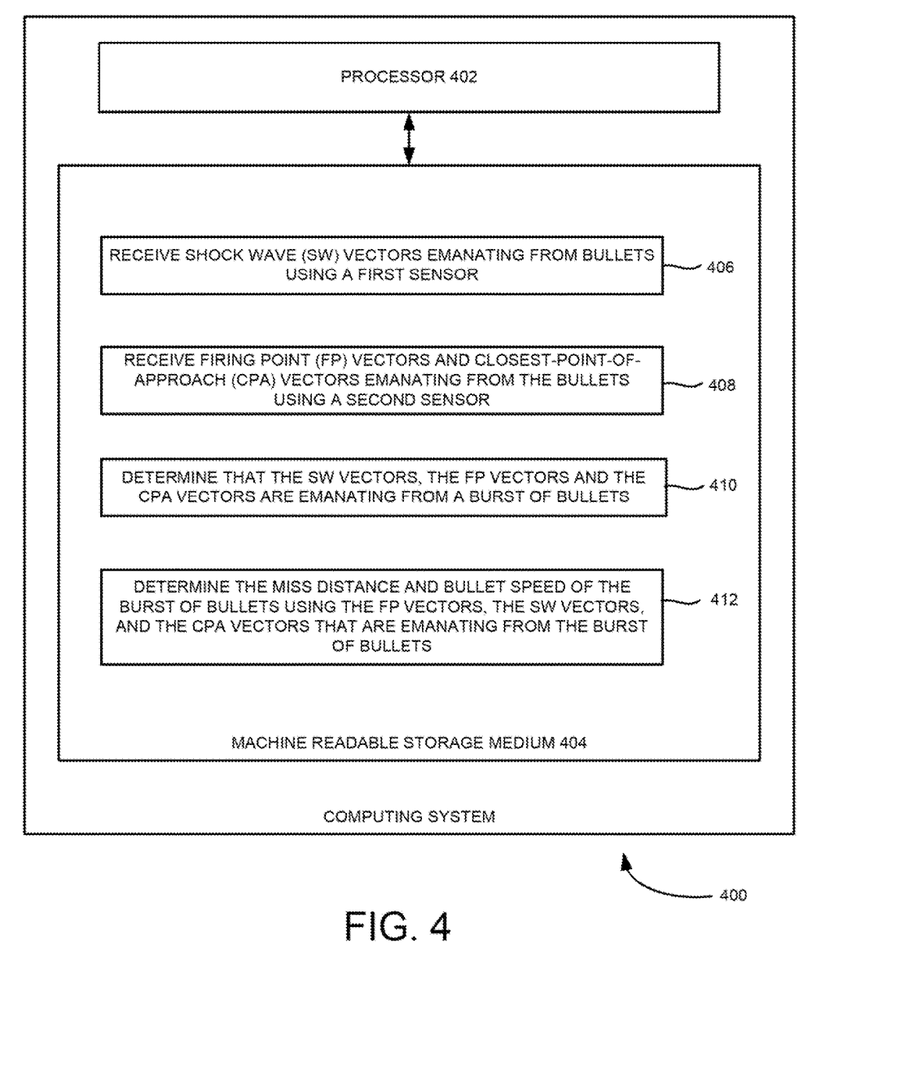
FIG. 4 illustrates a block diagram of an example computing system for determining a miss distance and bullet speed of a burst of bullets.

FIG. 4 illustrates a block diagram of an example computing system 400 for determining miss distance and bullet speed of a burst of bullets in a burst mode. The computing system 400 includes a processor 402 and a machine-readable storage medium 404 communicatively coupled through a system bus. The processor 402 may be any type of central processing unit (CPU), microprocessor, or processing logic that interprets and executes machine-readable instructions stored in the machine-readable storage medium 404. The machine-readable storage medium 404 may be a random access memory (RAM) or another type of dynamic storage device that may store information and machine-readable instructions that may be executed by the processor 402. For example, the machine-readable storage medium 404 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 404 may be a non-transitory machine-readable medium. In an example, the machine-readable storage medium 404 may be remote but accessible to the computing system 400.

The machine-readable storage medium 404 may store instructions 406, 408, 410, and 412. In an example, instructions 406, 408, 410, and 412 may be executed by processor 402 for determining the miss distance and bullet speed of the bullet in the burst mode.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The present description has been shown and described with reference to the foregoing examples. It is understood, however, that other forms, details, and examples can be made without departing from the spirit and scope of the present subject matter that is defined in the following claims.

What is claimed is:

1. A method for determining miss distance and bullet speed of a burst of bullets, the method comprising:
    estimating shock wave (SW) vectors emanating from bullets using a first sensor;
    estimating firing point (FP) vectors and closest-point-of-approach (CPA) vectors emanating from the bullets using a second sensor, wherein the first sensor and the second sensor are located on a single platform;
    determining that the SW vectors, the FP vectors and the CPA vectors are emanating from the burst of bullets; and
    determining the miss distance and bullet speed of the burst of bullets using the FP vectors, the SW vectors, and the CPA vectors that are emanating from the burst of bullets.

2. The method of claim 1, wherein determining that the SW vectors, the FP vectors and the CPA vectors are emanating from the burst of bullets, comprises:
    computing a shock angle between the CPA vectors and the SW vectors; and
    determining that the SW vectors, the FP vectors and the CPA vectors are emanating from the same burst of bullets when the computed shock angle is within a predetermined range.

3. The method of claim 1, wherein determining that the SW vector, the FP vector and the CPA vector are emanating from the burst of bullets comprises:
    performing a coplanar check to determine whether the FP vectors, the CPA vectors, and the SW vectors are substantially coplanar; and
    determining that the SW vectors, the FP vectors and the CPA vectors are emanating from the same burst of bullets when the FP vectors, the CPA vectors, and the SW vectors are substantially coplanar.

4. The method of claim 1, wherein determining that the SW vectors, the FP vectors and the CPA vectors are emanating from the burst of bullets comprises:
    determining whether the SW vectors lies in between the CPA vectors and the FP vectors; and
    determining that the SW vectors, the FP vectors and the CPA vectors are emanating from the same burst of bullets when the SW vectors lies in between the CPA vectors and the FR vectors.

5. The method of claim 1, wherein the SW vectors comprise a direction of SWs of the bullets relative to the platform, and wherein the FP vectors and the CPA vectors comprise a direction of FPs and a direction of CPAs, respectively, of the bullets relative to the platform.

6. The method of claim 1, wherein the first sensor comprises an acoustic sensor, and wherein the second sensor comprises an electro-optic sensor.

7. The method of claim 1, wherein determining the miss distance and bullet speed of the burst of bullets using the FP vectors, the SW vectors, and the CPA vectors that are emanating from the burst of bullets, comprises:
    computing an aggregated estimate of the SW vectors, an aggregated estimate of the FR vectors, and an aggregated estimate of the CPA vectors; and
    determining the miss distance and bullet speed of the burst of bullets using the aggregated estimate of the SW vectors, the aggregated estimate of the FR vectors and the aggregated estimate of the CPA vectors.

8. A system for determining miss distance and bullet speed of a burst of bullets, the system comprising:
    a first sensor to detect shock wave (SW) vectors emanating from bullets;
    a second sensor to detect firing point (FP) vectors and closest-point-of-approach (CPA) vectors emanating from the bullets, wherein the first sensor and the second sensor are located on a single platform;
    a computational unit communicatively coupled to the first sensor and the second sensor, the computational unit is configured to:
        determine that the SW vectors, the FP vectors and the CPA vectors are emanating from the burst of bullets; and
        determine the miss distance and bullet speed of the burst of bullets using the FP vectors, the SW vectors, and the CPA vectors that are emanating from the burst of bullets.

9. The system of claim 8, wherein the computational unit determines the miss distance and bullet speed of the burst of bullets by:
    computing an aggregated estimate of the SW vectors, an aggregated estimate of the FP vectors, and an aggregated estimate of the CPA vectors; and
    determining the miss distance and bullet speed of the burst of bullets using the aggregated estimate of the SW vectors, the aggregated estimate of the FP vectors and the aggregated estimate of the CPA vectors.

10. The system of claim 8, wherein the computational unit determines that the SW vectors, the FP vectors and the CPA vectors are emanating from the burst of bullets by:
    computing a shock angle between the CPA vectors and the SW vectors; and
    determining that the SW vectors, the FP vectors and the CPA vectors are emanating from the same burst of bullets when the computed shock angle is within a predetermined range.

11. The system of claim 8, wherein the computational unit determines that the SW vectors, the FP vectors and the CPA vectors are emanating from the burst of bullets by:
    performing a coplanar check to determine whether the FP vectors, the CPA vectors, and the SW vectors are substantially coplanar; and
    determining that the SW vectors, the FP vectors and the CPA vectors are emanating from the same burst of bullets when the FP vectors, the CPA vectors, and the SW vectors are substantially coplanar.

12. The system of claim 8, wherein the computational unit determines that the SW vectors, the FP vectors and the CPA vectors are emanating from the burst of bullets by:

determining whether the SW vectors lies in between the CPA vectors and the FP vectors; and determining that the SW vectors, the FP vectors and the CPA vectors are emanating from the same burst of bullets when the SW vectors lies in between the CPA vectors and the FP vectors.

13. The system of claim 8, wherein the first sensor comprises an acoustic sensor, and wherein the second sensor comprises an electro-optic sensor.

14. A non-transitory computer-readable storage medium including instructions that are executed by a computation unit to:

receive shock wave (SW) vectors emanating from bullets using a first sensor;

receive firing point (FP) vectors and closest-point-of-approach (CPA) vectors emanating from the bullets using a second sensor, wherein the first sensor and the second sensor are located on a single platform;

determine that the SW vectors, the FP vectors and the CPA vectors are emanating from a burst of bullets; and determine a miss distance and bullet speed of the burst of bullets using the FP vectors, the SW vectors, and the CPA vectors that are emanating from the burst of bullets.

15. The non-transitory computer-readable storage medium of claim 14. wherein determining that the SW vectors, the FP vectors and the CPA vectors are emanating from the burst of bullets, comprises:

computing a shock angle between the CPA vectors and the SW vectors; and determining that the SW vectors, the FP vectors and the CPA vectors are emanating from the same burst of bullets when the computed shock angle is within a predetermined range.

16. The non-transitory computer-readable storage medium of claim 14, wherein determining that the SW vector, the FP vector and the CPA vector are emanating from the burst of bullets comprises:

performing a coplanar check to determine whether the FP vectors, the CPA vectors, and the SW vectors are substantially coplanar; and determining that the SW vectors, the FP vectors and the CPA vectors are emanating from the same burst of bullets when the FP vectors, the CPA vectors, and the SW vectors are substantially coplanar.

17. The non-transitory computer-readable storage medium of claim 14, wherein determining that the SW vectors, the FP vectors and the CPA vectors are emanating from the burst of bullets comprises:

determining whether the SW vectors lies in between the CPA vectors and the FP vectors; and determining that the SW vectors, the FP vectors and the CPA vectors are emanating from the same burst of bullets when the SW vectors lies in between the CPA vectors and the FP vectors.

18. The non-transitory computer-readable storage medium of claim 14, wherein the first sensor comprises an acoustic sensor, and wherein the second sensor comprises an electro-optic sensor.

19. The non-transitory computer-readable storage medium of claim 14, wherein determining the miss distance and bullet speed of the burst of bullets using the FP vectors, the SW vectors, and the CPA vectors that are emanating from the burst of bullets, comprises:

computing an aggregated estimate of the SW vectors, an aggregated estimate of the FP vectors, and an aggregated estimate of the CPA vectors; and determining the miss distance and bullet speed of the burst of bullets using the aggregated estimate of the SW vectors, the aggregated estimate of the FP vectors and the aggregated estimate of the CPA vectors.

20. The non-transitory computer-readable storage medium of claim 14, wherein the SW vectors comprise a direction of SWs of the bullets relative to the platform, and wherein the FP vectors and the CPA vectors comprise a direction of FPs and a direction of CPAs, respectively, of the bullets relative to the platform.

\* \* \* \* \*